US012618766B2

(12) United States Patent
Gao et al.

(10) Patent No.: US 12,618,766 B2
(45) Date of Patent: May 5, 2026

(54) AIRBORNE-PARTICLE DETECTOR AND DETECTION METHOD

(71) Applicants: The Regents of the University of Colorado, Denver, CO (US); United States of America, as represented by the Secretary of Commerce, Silver Spring, MD (US)

(72) Inventors: Ru-Shan Gao, Boulder, CO (US); Joshua Peter Schwarz, Boulder, CO (US)

(73) Assignees: The Regents of the University of Colorado, a body corporate, Denver, CO (US); United States of America, as represented by the Secretary of Commerce, Silver Spring, MD (US)

( * ) Notice: Subject to any disclaimer, the term of this patent is extended or adjusted under 35 U.S.C. 154(b) by 0 days.

(21) Appl. No.: 19/263,942

(22) Filed: Jul. 9, 2025

(65) Prior Publication Data

US 2026/0016394 A1    Jan. 15, 2026

Related U.S. Application Data

(60) Provisional application No. 63/669,107, filed on Jul. 9, 2024.

(51) Int. Cl.
*G01N 15/1434* (2024.01)
*G01N 15/14* (2024.01)
(52) U.S. Cl.
CPC ... *G01N 15/1434* (2013.01); *G01N 2015/144* (2013.01); *G01N 2015/1493* (2013.01)

(58) Field of Classification Search
None
See application file for complete search history.

(56) References Cited

U.S. PATENT DOCUMENTS

| | | | |
|---|---|---|---|
| 8,643,836 B1 * | 2/2014 | Tsai ................... | G01N 21/9501 |
| | | | 356/237.4 |
| 2003/0223063 A1 * | 12/2003 | Hill .................... | G01N 15/1434 |
| | | | 356/340 |
| 2007/0013910 A1 * | 1/2007 | Jiang ...................... | G01N 21/05 |
| | | | 356/336 |
| 2024/0304430 A1 * | 9/2024 | Vaez-Iravani .......... | G01N 21/01 |

OTHER PUBLICATIONS

Fujiwara et al., "Development of a cloud particle sensor for radio-sonde sounding", Atmospheric Measurement Techniques, vol. 9, Dec. 2016, pp. 5911-5931.

* cited by examiner

*Primary Examiner* — Rufus L Phillips
(74) *Attorney, Agent, or Firm* — Cozen O'Connor

(57) ABSTRACT

An airborne-particle detector includes a first emitter unit, a second emitter unit, and a photodetector. The first emitter unit includes a first light emitter and a first imaging element, that outputs a first incident beam propagating in a first direction toward a scattering region. The second emitter unit includes a second light emitter and a second imaging element, that outputs a second incident beam propagating toward the scattering region in a second direction substantially antiparallel to the first direction. the first imaging element images the first light emitter to a first image plane. The second imaging element images the second light emitter to a second image plane. The scattering region is between the first image plane and the second image plane. The photodetector detects scattered illumination from the scattering region.

20 Claims, 6 Drawing Sheets

AIRBORNE-PARTICLE DETECTOR AND DETECTION METHOD

CROSS-REFERENCE TO RELATED APPLICATION

This application claims the benefit of U.S. Provisional Application No. 63/669,107, filed on 9 Jul. 2024, the disclosure of which is incorporated herein by reference in its entirety.

GOVERNMENT RIGHTS

This invention was made with government support under grant number NA220AR4320151 awarded by NOAA. The government has certain rights in the invention.

BACKGROUND

Cirrus clouds in the upper troposphere play an important role in the climate system. The fundamental understanding of cirrus behavior still needs to be improved, which requires detailed measurements of cloud particle distributions. Currently there is no instrument available for routine in situ measurements to provide process-level relevant information about cirrus extent, thickness, and ice crystal size distribution.

SUMMARY OF THE EMBODIMENTS

In a first aspect, an airborne-particle detector includes a first emitter unit, a second emitter unit, and a photodetector. The first emitter unit includes a first light emitter and a first imaging element, that outputs a first incident beam propagating in a first direction toward a scattering region. The second emitter unit includes a second light emitter and a second imaging element, that outputs a second incident beam propagating toward the scattering region in a second direction substantially antiparallel to the first direction. The first imaging element images the first light emitter to a first image plane. The second imaging element images the second light emitter to a second image plane. The scattering region is between the first image plane and the second image plane. The photodetector detects scattered illumination from the scattering region.

In a second aspect, a method for detecting scattered light includes illuminating a scattering region from opposite sides of the scattering region. The method also includes directing light scattered from the scattering region to a photodetector.

DETAILED DESCRIPTION OF THE EMBODIMENTS

At present, the most reliable and low-cost method to obtain regular measurements in the upper troposphere is via weather balloons with disposable payloads. These require a lightweight and low-power draw instrument capable of measuring cirrus cloud properties. Airborne-particle detectors disclosed herein are an example of such an instrument.

Embodiments disclosed herein include an in-situ balloon-borne airborne-particle detector. Embodiments of the particle detector measure cloud particle size spectra and cloud-crystal number densities. In a use scenario, embodiments of the detector are low cost (disposable), light weight (suitable for the weather balloon platform), and have a large sampling cross section (to sample reasonably large volume of air necessary for balloon applications directed at very low concentration particles). An airborne-particle detector may be designed for low sizing ambiguity and sensitivity even to smaller ice crystals. In embodiments, the detector can detect particles smaller than three micrometers in diameter.

Embodiments of an in-situ balloon-borne airborne-particle detector include at least one the following features:

1. One or more LED light sources that emit broadband illumination, which contributes to low cost, robust performance, and reduction of Mie resonances that degrade accurate particle sizing.
2. Illumination of the sensing area with two opposing light sources to provide a more uniform light field, which is important for accurate particle sizing.
3. Large Fresnel lenses for more uniform and effective light-signal collection across the sensing area. This is important for accurate sizing, while being exceptionally light weight and low cost.
4. An inlet shroud for directing sample flow into the flow tube in anticipation of the use in swinging balloon-borne payloads.

Herein, a number in parentheses following a reference number is an instance of the referent of the reference number. For example, embodiments herein include light emitters 110(1) and 110(2). Statements describing features and/or properties of a referent using a reference number lacking parentheses, e.g., "light emitter 110" may apply to one or more instances of the referent with parentheses, e.g., one or more of light emitters 110(1) and 110(2). Also, the letter k in parentheses following a reference number is the $k^{th}$ instance of the referent of the reference number. For example, the light emitter 110(k) refers to light emitter 110(1) when k=1 and to light emitter 110(2) when k=2.

Figure 1:
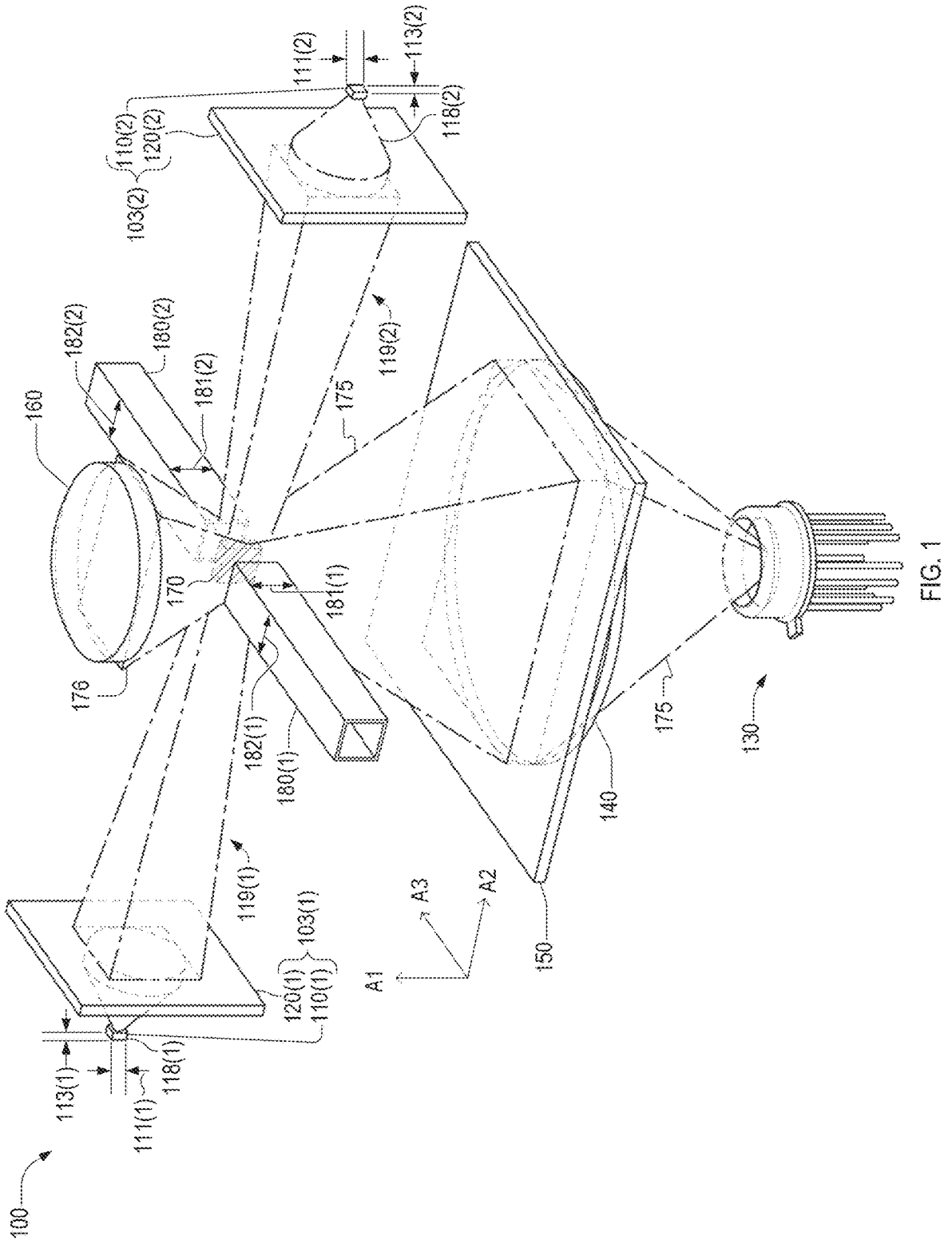
FIGS. 1-3 are schematics of an airborne-particle detector, in an embodiment.
Figure 2:
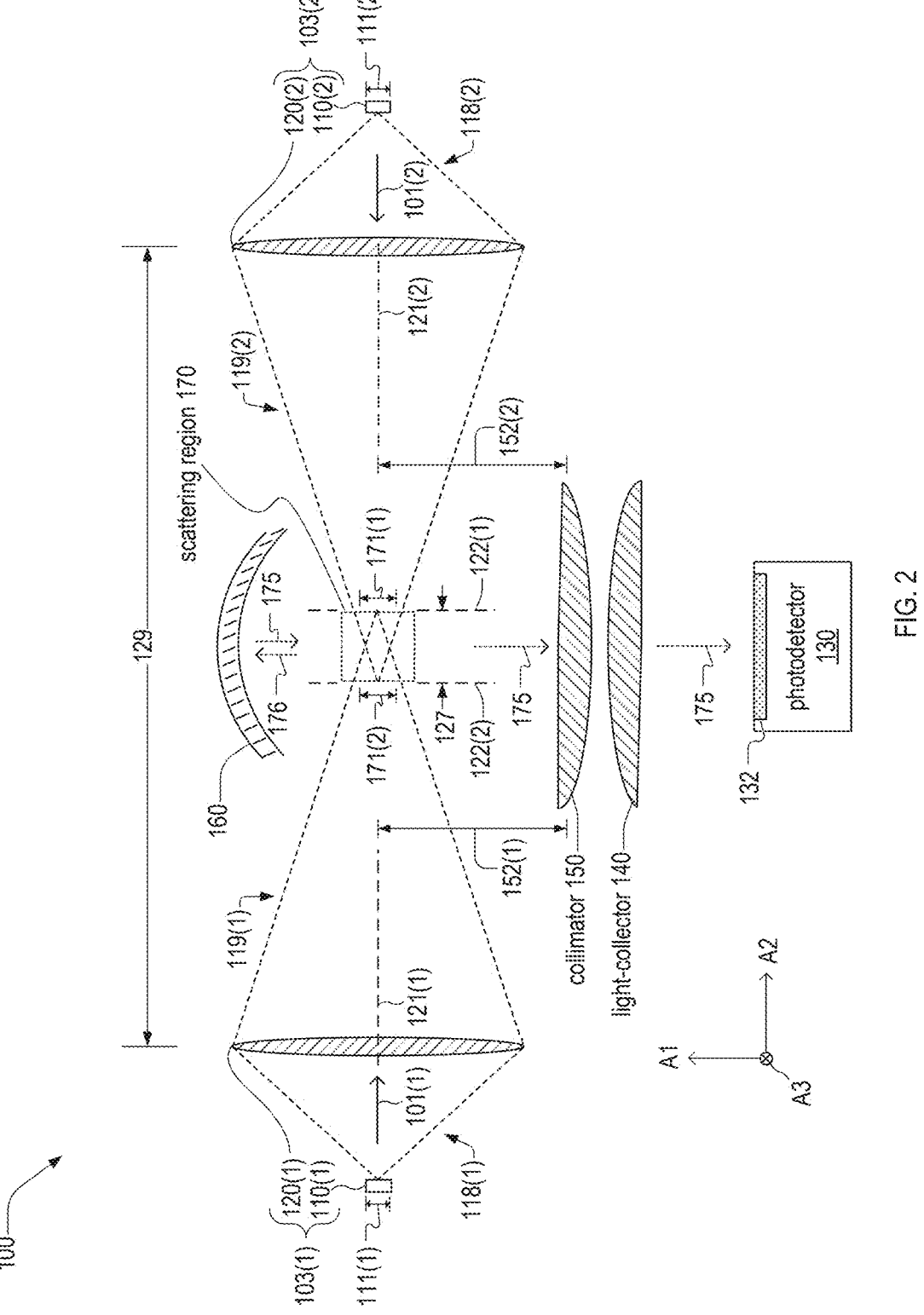
Figure 3:
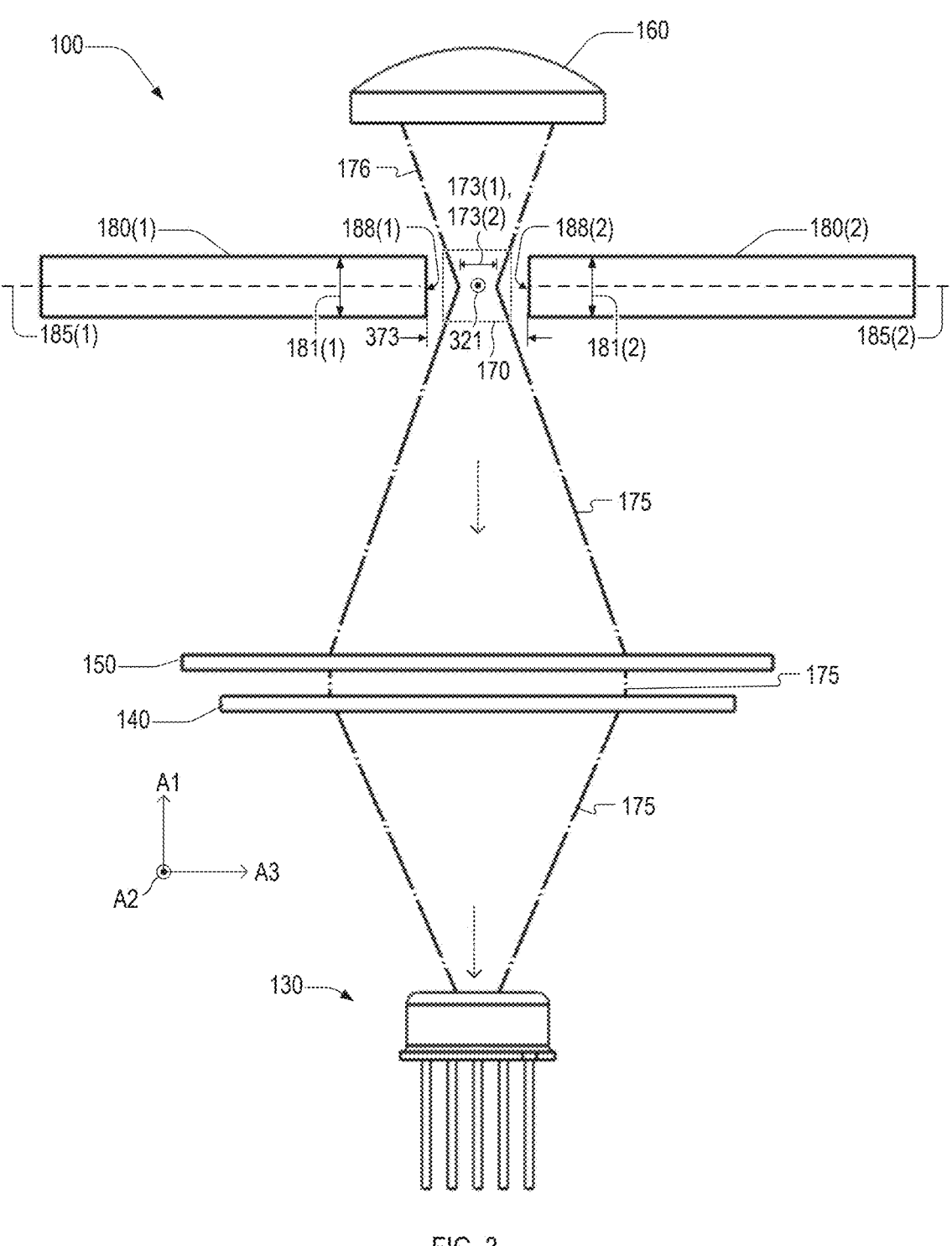

FIGS. 1-3 are schematics of an airborne-particle detector 100. FIGS. 1-3 depict at least two of orthogonal axes A1, A2, and A3. Unless otherwise specified, a horizontal plane (or horizontal direction) is parallel to the A1-A2 plane, and a vertical direction is along axis A3.

FIG. 1 is an isometric view of airborne-particle detector 100. FIG. 2 is a cross-sectional view in a cross-sectional plane parallel to the A1-A2 plane. FIG. 3 is a cross-sectional view in a cross-sectional plane parallel to the A1-A3 plane. FIGS. 1-3 are best viewed together in the following description.

Airborne-particle detector 100 includes emitter units 103(1) and 103(2). Emitter unit 103(1) includes a light emitter 110(1) and an imaging element 120(1). Emitter unit 103(2)

includes a light emitter 110(2) and an imaging element 120(2). Airborne-particle detector 100 may also include at least one of a photodetector 130, a light-collector 140, a collimator 150, and a reflector 160.

An emitter unit 103 may also include beam-steering optics, e.g., along an optical path between light emitter 110 and imaging element 120, or on an optical path after imaging element 120. Each of imaging elements 120, light-collector 140, and collimator 150 may be, or include, a refractive lens, a diffractive lens, a Fresnel lens, a mirror, or any combination thereof. Reflector 160 may include a mirror (e.g., a concave mirror), a prism, or a combination thereof.

Emitter 110(1) emits illumination 118(1), at least part of which is output by emitter unit 103(1) as an incident optical beam 119(1), which propagates in a direction 101(1) toward a scattering region 170. Emitter 110(2) emits illumination 118(2), at least part of which is output by emitter unit 103(2) as an incident optical beam 119(2), which propagates toward light emitter 110(1) in a direction 101(2) toward scattering region 170. Axis A2 may be parallel to at least one of directions 101. Direction 101(2) may be substantially opposite to, that is, substantially antiparallel to, direction 101(1).

Herein, directions (or axes) that are "substantially" parallel, antiparallel, or perpendicular include directions (or axes) that deviate from being exactly parallel, antiparallel, or perpendicular, respectively, by at most ten degrees. In embodiments, directions 101(1) and 101(2) deviate from being exactly antiparallel by less than ten degrees, five degrees, or one degree.

Deviations from an anti-parallel configuration increase inhomogeneity (decrease spatial uniformity) of the intensity of optical beams 119 in scattering region 170. A spatially homogenous optical intensity of optical beams 119 is desirable for distinguishing between different sized particles traversing scattering region 170. When every particle traversing scattering region 170 experiences the same amount of light intensity, the resulting measured scattering signal received by photodetector 130, relates to the particle size, and is independent of position in the detection area.

In embodiments, one of emitter units 103 lacks a light emitter 110 and instead includes a retroreflector. The retroreflector reflects optical beam 119 incident thereon back toward scattering region 170. However, embodiments in which both emitter units 103 include a respective emitter 110 may at least one of: greater light intensity and spatial uniformity, less weight, construction cost, and greater tolerance to alignment.

In embodiments, imaging elements 120 are between light emitter 110(1) and 110(2) along direction 101(1). Imaging element 120(1) may be between imaging element 120(2) and light emitter 110(1) along direction 101(1). Imaging element 120(2) may be between imaging element 120(1) and light emitter 110(2) along direction 101(1). Imaging element 120(1) images light emitter 110(1) to an image plane 122(1). Imaging element 120(2) images light emitter 110(2) to an image plane 122(2).

Along direction 101(1), imaging elements 120 are separated by a distance 129, which may be equal to, greater than, or less than a sum of the focal length of imaging element 120(1) and the focal length of imaging element 120(2). Image plane 122(1) may be between image plane 122(2) and one or both of imaging element 120(2) and emitter unit 103(2). Image plane 122(2) may be between image plane 122(1) and one or both of imaging element 120(1) and emitter unit 103(1). Image plane 122(1) may be closer to imaging element 120(2) than to imaging element 120(1).

Image plane 122(2) may be closer to imaging element 120(1) than it is to imaging element 120(2).

Photodetector 130 detects scattered illumination 175 from scattering region 170, which may be between image planes 122(1) and 122(2). Scattering region 170 is intersected by at least one of an optical axis 121(1) of imaging element 120(1) and an optical axis 121(2) of imaging element 120(2). Optical axes 121(1) and 121(2) may be parallel. Imaging elements 120 may be coaxially aligned, in which case optical axes 121(1) and 121(2) are coaxial. One or both of directions 101 may be parallel to one or to both of optical axes 121. Photodetector 130 has a light-detecting region 132, which may face scattering region 170. Axis A2 may be parallel to one or both of optical axes 121.

Light-collector 140 collects scattered illumination 175 and directs the collected scattered illumination to photodetector 130. Collimator 150 is between light-collector 140 and scattering region 170. The cross-sectional view of FIG. 3 shows scattered illumination 175 being collimated by collimator 150 and focused by light-collector 140.

FIG. 1 denotes distances 152(1) and 152(2) between a principal plane of collimator 150 respective optical axes 121(1) and 121(2). In embodiments, at least one of distances 152 is substantially equal a focal length of collimator 150. For example, a difference between this focal length and at least one of distances 152 is less than the depth of field of an imaging system that includes collimator 150 and photodetector 130. This imaging system may also include light-collector 140.

In embodiments, the scattered illumination includes distal-scattered illumination 176 propagating away from photodetector 130. Reflector 160 reflects at least part of distal-scattered illumination 176 toward photodetector 130. In embodiments, and as illustrated in FIGS. 1 and 2, photodetector 130 and reflector 160 are on opposite sides of scattering region 170 along a direction that is substantially perpendicular to one or both of optical axes 121.

Airborne-particle detector 100 may include at least one of an inlet tube 180(1) and an inlet tube 180(2), shown in FIG. 1, to contain particle flow within the range illuminated in scattering region 170. Along axis A2, at least part of inlet tube 180(1) is between image plane 122(1) and image plane 122(2). Inlet tube 180(1) has a tube-axis 185(1), shown in FIG. 3, that is substantially perpendicular to directions 101. Along direction A3, at least part of inlet tube 180(2) is between image planes 122(1) and 122(2), Inlet tube 180(2) has a tube-axis 185(2), shown in FIG. 3, that is substantially parallel to the tube-axis 185(1) and extends through inlet tube 180(1). Tube-axes 185(1) and 185(2) may be coaxial. Axes A3 may be parallel to one or both of tube axes 185. Inlet tubes 180 direct sample air through scattering region 170. The sample air may contain cirrus cloud crystals. While FIG. 1 illustrates inlet tubes 180 as having a square cross-section shape, the cross-section may be differently shaped, e.g., circular, elliptical, polygonal, without departing from the scope hereof.

In a use scenario, detector 100 is airborne and suspended from a weather balloon, and tube-axes 185 and A3 are substantially parallel to the direction of Earth's gravity. One or both of inlet tubes 180 may be electrically conductive, e.g., formed of a metal, which reduces losses of detected charged particles due to electrostatic forces. Candidate materials for inlet tubes 180 include metals, such as brass, copper, or a combination thereof.

Imaging elements 120(1,2) images respective light emitter 110(1,2) to respective image planes 122(1,2). Light emitters 110(1,2) have respective dimensions 111(1,2) along axis A1 and respective dimensions 113(1,2) along axis A3. The image of light emitter 110(1), or part of light emitter 110(1), in image plane 122(1) has an image-dimension 173(1) and an image-dimension 171(1). The image of light emitter 110(2), or part of light emitter 110(2), in image plane 122(2) has an image-dimension 173(2) an image-dimension 171(2). Image-dimensions 171 and 173 may be transverse dimensions of scattering region 170 along axes A1 and A3, respectively. In embodiments, image-dimensions 171 and 173 are dimensions of the image of an unobscured region of a light-emitting surface of light emitter 110.

Image-dimensions 171 are parallel to axis A1 and shown in FIG. 2. Image-dimensions 173 are parallel to axis A3 and shown in FIG. 3. For simplicity of illustration, FIG. 3 denotes a single dimension line to represent each of image-dimensions 173(1) and 173(2), which may be equal or unequal to each other.

Each of emitter units 103 has magnifications $M_x$ and $M_z$. Magnification $M_z$ is the ratio of image-dimension 173 to emitter-dimension 113. Magnification $M_x$ is the ratio of image-dimension 171 to emitter-dimension 111. Said magnifications $M_x$ and $M_z$ may be greater than one. For example, either or both of magnification $M_x$ and $M_z$ may be between 5.5 and 6.5. In embodiments, emitter-dimensions 111 and/or emitter-dimensions 113 are between 0.4 mm and 0.6 mm. Image-dimensions 173 and/or image-dimensions 171 may be between 2.2 mm and 3.9 mm. Imaging elements 120 may have a diameter between 12 mm and 14 mm, and a focal length between 9 mm and 11 mm, e.g., between 10 mm and 11 mm.

Inlet tubes 180(1,2) have respective tube-ends 188(1,2) proximate scattering region 170, as shown in FIG. 3. Along axis A1, one or both of tube-ends 188 may be directly between imaging elements 120. At tube-end 188($k$), tube 180($k$) has an aperture dimension 181($k$), each of which may be less than or equal to one or both of image-dimensions 171. At tube-end 180($k$), inlet tube 180($k$) has an aperture dimension 182($k$), shown in FIG. 1. One or both of aperture dimensions 182 may be less than or equal to a distance 127 between image planes 122, shown in FIG. 2.

Tube-ends 188(1) and 181(2) are separated by a distance 373 along axis A3, as shown in FIG. 3. Distance 373 may exceed each of image-dimensions 173. FIG. 3 denotes an optical axis 321, which represents at least one of optical axes 121(1) and 121(2). Along axis A2, a distance between tube-end 188(1) and optical axis 321 may exceed each of image-dimension 173(1) and image-dimension 173(2). Similarly, along axis A1, a distance between tube-end 188(2) and optical axis 321 may exceed each of image-dimension 173(1) and second image-dimension 173(2).

FIGS. 1-3 imaging elements 120(1) and 120(2) being on opposite sides of scattering region 170 along axis A2 and inlet tubes 180(1) and 180(2) being on opposite sides of scattering region 170 along axis A3. Embodiments of airborne-particle detector 100 may have different configurations of imaging elements 120 and/or inlet tubes 180. In embodiments, directions 101(1) and 101(2) are closer to being perpendicular than to being parallel. For example, direction 101(2) and optical axis 121(2) may be parallel to the A1-A2 plane and substantially parallel to axis A2. In embodiments, for example, the positions of emitter unit 103(2) and inlet tube 180(2) may be switched relative to those shown in FIG. 1 such that: optical axis 121(2) is substantially parallel to axis A2, tube-end 188(2) faces imaging element 120(1), and tube-end 188(1) faces emitter unit 103(2).

Figure 4:
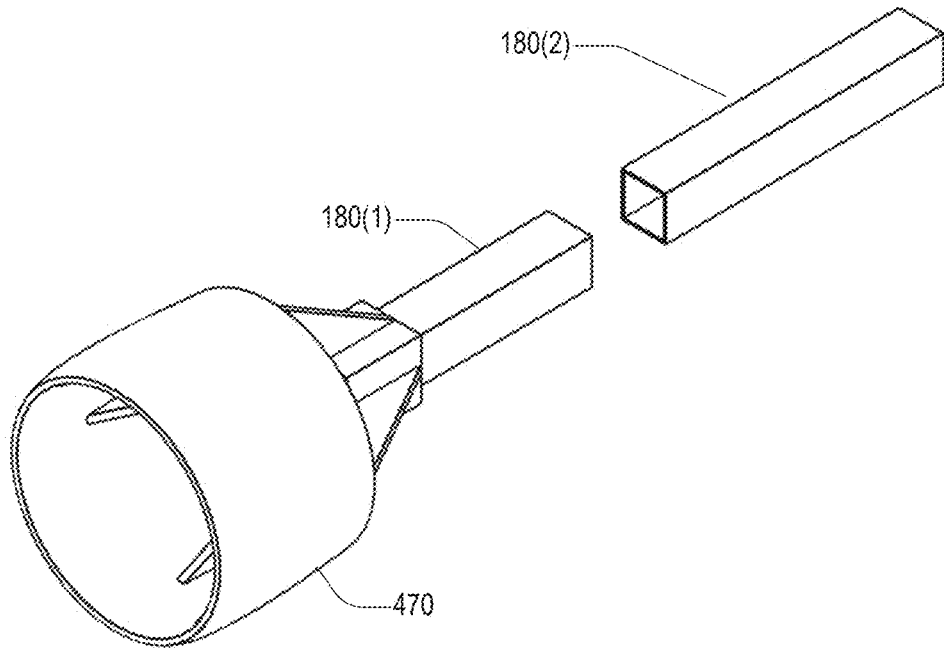
FIGS. 4 and 5 are schematics of a shroud attached to an inlet tube of an embodiment of the airborne particle detector of FIGS. 1-3.
Figure 5:
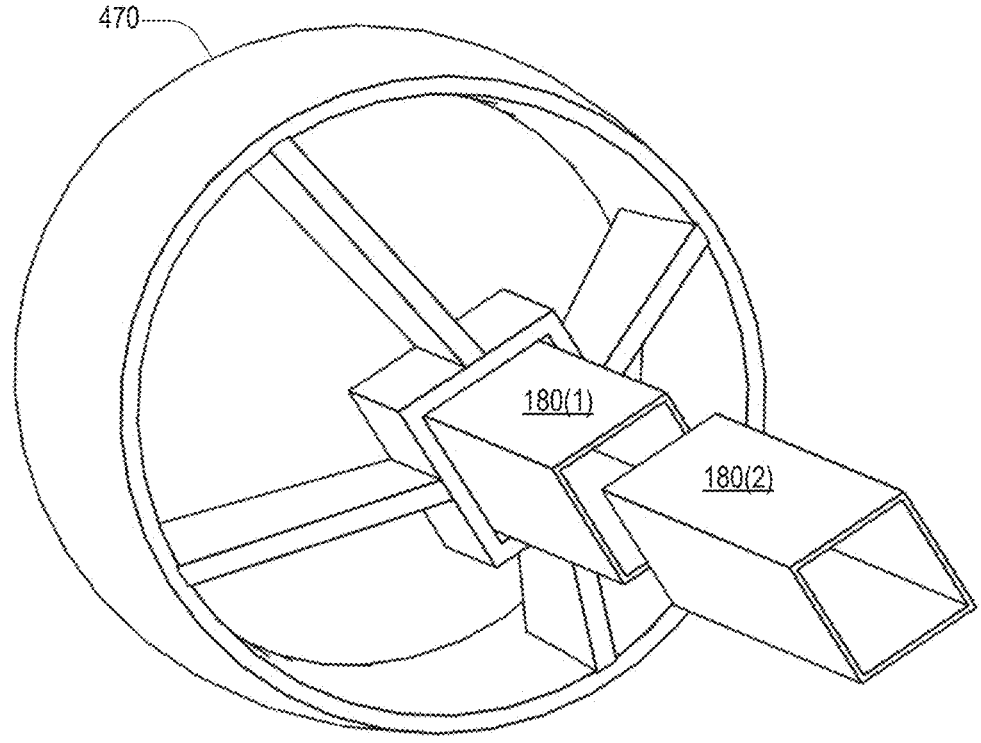

Airborne-particle detector 100 may include a shroud 470 attached to inlet tube 180(1), as shown in FIGS. 4 and 5. Shroud 470 guides ice crystals to scattering region 170, e.g., via inlet tube 180(1).

In some use scenarios of airborne-particle detector 100, it is technically beneficial to limit the size of image-dimension 173. Image-dimension 173 is parallel to axis A3, the direction of particles traversing scattering region 170. This size reduction makes it less likely that multiple particles will scatter light at the same time. Such simultaneous (or near simultaneous) scattering events complicate particle sizing and concentration calculations. One way of limiting the size of image-dimension 173 is to cover part of a light-emitting surface of light emitter 110, as illustrated in FIGS. 6A and 6B.

Figure 6A:
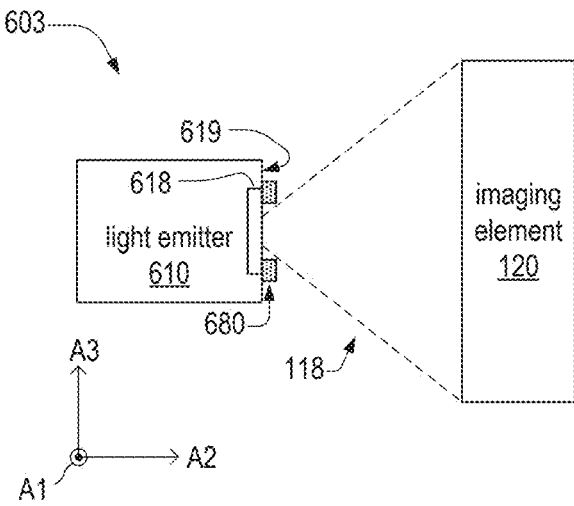
FIG. 6A is a side view of an emitter unit, which is an example of an emitter of the airborne-particle detector of FIG. 1.

FIG. 6A is a side view of an emitter unit 603, which is an example of emitter unit 103. Emitter unit 603 includes a light emitter 610, a light-blocking element 680, and imaging element 120. FIG. 6B is a plan view of light emitter 610 and light-blocking element 680 from a viewing direction parallel to axis A2. Light emitter 610 is an example of light emitter 110. FIGS. 6A and 6B are best viewed together in the following description.

Light emitter 610 has a front surface 619 that includes a light-emitting surface 618, which emits illumination 118 toward imaging element 120. Light-blocking element 680 may be on, e.g., directly on, at least part of each of surface 618 and/or surface 619. In embodiments, light-blocking element is directly on and/or attached to surface 619.

Figure 6B:
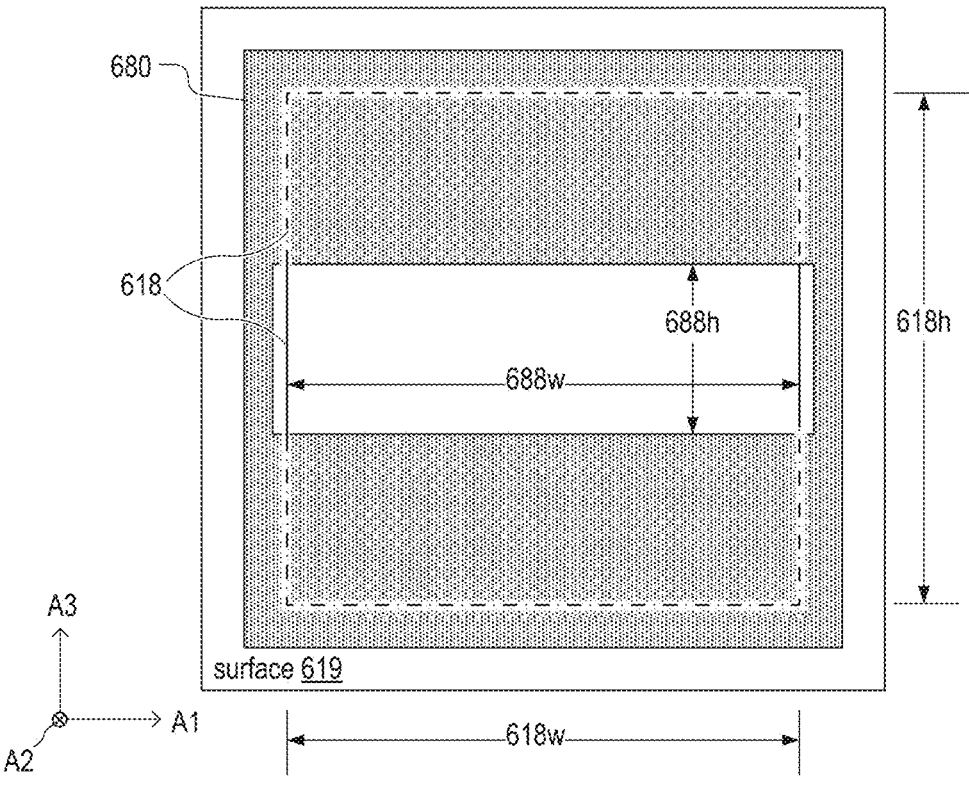
FIG. 6B is a plan view of a light emitter of the emitter unit of FIG. 6A with a light-blocking element to restrict the area emitting light.

Light-blocking element 680 may be a diaphragm, and hence have an aperture, as in the embodiment shown in FIGS. 6A and 6B. Alternatively, light-blocking element 680 may lack an aperture while covering part of light-emitting surface 618. Light-blocking element 680 may be between light emitter 610 and imaging elements 120 along axis A2. Blocking element 680 limits one or both of the height and width of scattering region 170, where height and width are parallel to axes A3 and A1, respectively.

Surface 618 has a width 618$w$ and a height 618$h$, which may equal width 618$w$. Light-blocking element 680 reduces the effective light-emitting area of front surface 619, along one or both of axis A1 and A3, to a width 688$w$ and a height 688$h$, respectively. In the example shown in FIG. 6B, widths 618$w$ and 688$w$ are equal, while height 688$h$ is less than height 618$h$. Hence, in this example, light-blocking element 680 limits only the height of scattering region 170. In embodiments, width 688$w$ exceeds height 688$h$, e.g., by a factor of between two and four, inclusive. For example, width 688$w$ is 1 mm and height 688$h$ is 0.5 mm.

Figure 7:
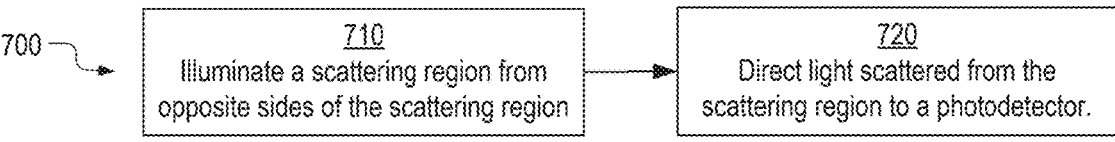
FIG. 7 is a flowchart illustrating an embodiment of a method for detecting scattered light, which may be implemented with the airborne-particle detector of FIGS. 1-3.

FIG. 7 is a flowchart illustrating a method 700 for detecting scattered light. Method 700 may be implemented by one or more aspects of airborne-particle detector 100. Method 700 includes at least one of steps 710 and 720.

Step 710 includes illuminating a scattering region from multiple sides of the scattering region. The multiple sides may include a first side and a second side that is opposite the first side, such that at least part of the scattering region is between the first and the second sides. In an example of step 710, emitter units 103(1) and 103(2) illuminate scattering region 170. Step 710 may include illuminating the scattering region with illumination having a center wavelength between 0.5 micrometers and 0.6 micrometers. In embodiments, an optical spectrum of the illumination has a full-width half-maximum spectral width of 100 nm or wider.

Step 720 includes directing light scattered from the scattering region to a photodetector. In an example of step 720, one or more of reflector 160, collimator 150, and light-collector 140 direct illumination 175 and/or illumination 176 to photodetector 130.

Light emitter 110 may be an LED, such as a lime green single-color LED. In embodiments, at leas tone of: (i) a center emission wavelength light emitter 110 is between 500 nm and 600 nm and (ii) a peak of the emission spectrum of light emitter 110 is between 500 nm and 700 nm, e.g., between 500 nm and 600 nm. The emission peak may be within a smaller wavelength range, examples of which include 525-575 nm, 545-555 nm, 560-570 nm. A full-width half-maximum width of the emission spectrum may exceed 100 nm. For example, the FWHM width may be between 100 nm and 140 nm, e.g., 120 nm. A technical benefit of the above spectral features is shown in FIG. 8.

Figure 8:
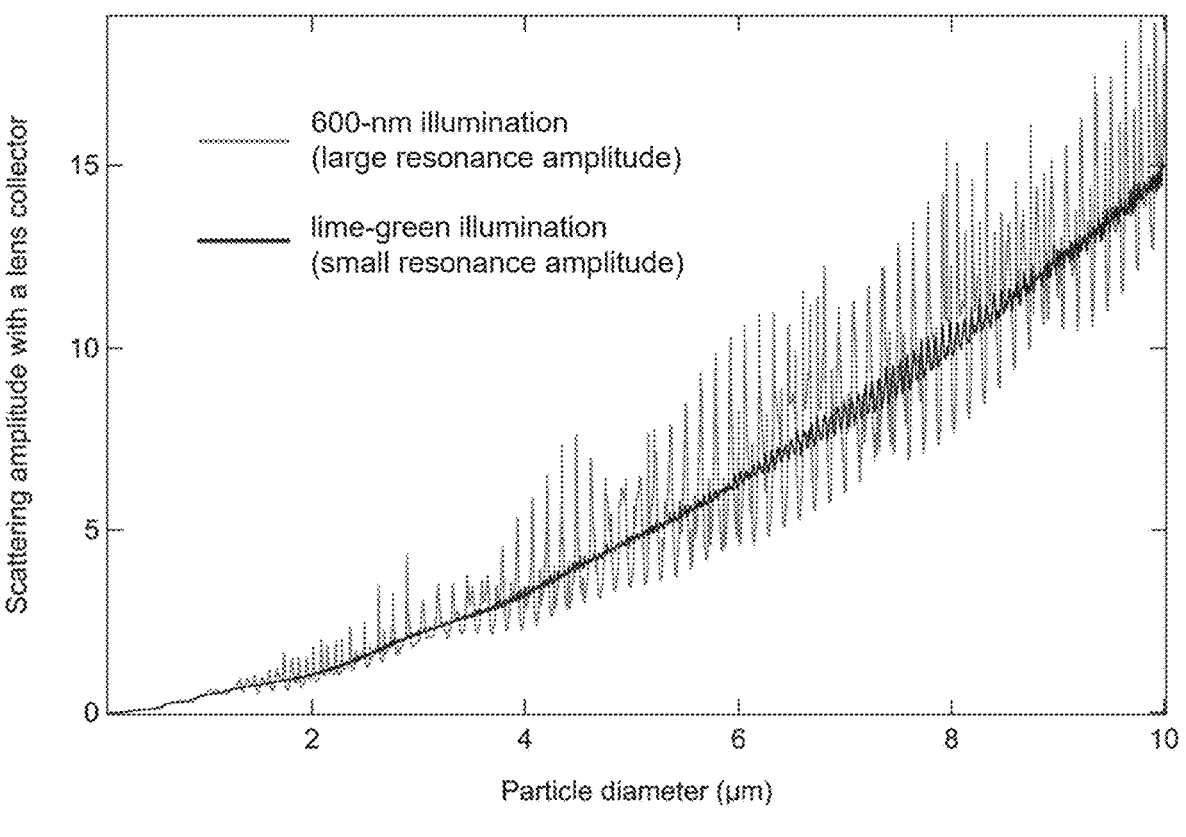
FIG. 8 is a plot of scattering amplitude as a function of particle diameter for single-wavelength illumination ($\lambda$=600 nm) and a broadband lime-green illumination.

FIG. 8 is a plot of scattering amplitude as a function of particle diameter for single-wavelength illumination ($\lambda$=600 nm) and a broadband lime-green illumination. The narrow 600-nm illumination generates Mie resonances that degrade particle sizing capabilities. This issue is common to any usable single wavelength light source. The larger spectral bandwidth of the lime-green illumination yields a signal with reduced amplitudes of Mie resonances. Other light sources with broadband character but at different central wavelengths are also appropriate.

Combinations of Features

Features described above, as well as those claimed below, may be combined in various ways without departing from the scope hereof. The following enumerated examples illustrate some possible, non-limiting combinations.

Embodiment 1. An airborne-particle detector comprising: a first emitter unit, including a first light emitter and a first imaging element, that outputs a first incident beam propagating in a first direction toward a scattering region; a second emitter unit, including a second light emitter and a second imaging element, that outputs a second incident beam propagating toward the scattering region in a second direction substantially antiparallel to the first direction; and a photodetector that detects scattered illumination from the scattering region; wherein: the first imaging element images the first light emitter to a first image plane, the second imaging element images the second light emitter to a second image plane, the scattering region is between the first image plane and the second image plane.

Embodiment 2. The airborne-particle detector of embodiment 1, the first imaging element being between the first light emitter and the second imaging element along the first direction; and/or the second imaging element being between the second light emitter and the first imaging element along the first direction.

Embodiment 3. The airborne-particle detector of either one of embodiments 1 or 2, along the first direction: the first image plane being between (i) the second image plane and (ii) one or both of the second imaging element and the second emitter unit; and/or the second image plane being between (i) the first image plane and (ii) one or both of the first imaging element and the first emitter unit.

Embodiment 4. The airborne-particle detector of any one of embodiments 1-3, a center emission wavelength of one or both of the first light emitter and the second light emitter being between 0.5 micrometers and 0.6 micrometers.

Embodiment 5. The airborne-particle detector of any one of embodiments 1-4, an emission spectrum of one or both of the first light emitter and the second light emitter having a full-width half-maximum spectral width of at least 100 nanometers.

Embodiment 6. The airborne-particle detector of any one of embodiments 1-5, the scattering region being intersected by at least one of a first optical axis of the first imaging element and a second optical axis of the second imaging element.

Embodiment 7. The airborne-particle detector of any one of embodiments 1-6, further comprising a light-collector that collects the scattered illumination and directs the collected scattered illumination to the photodetector.

Embodiment 8. The airborne-particle detector of embodiment 7, further comprising a collimator between the light-collector and the scattering region.

Embodiment 9. The airborne-particle detector of any one of embodiments 1-8, and further comprising: a reflector that reflects part of the scattered illumination toward the photodetector.

Embodiment 10. The airborne-particle detector of embodiment 9, the photodetector being on a first side of the scattering region, the reflector being on a second side of the scattering region opposite the first side and facing the photodetector.

Embodiment 11. The airborne-particle detector of either one of embodiments 9 or 10, the reflector including a concave mirror.

Embodiment 12. The airborne-particle detector of any one of embodiments 1-11, further comprising: a first tube extending between the first image plane and the second image plane, and having a first tube-axis that is substantially perpendicular to the first direction.

Embodiment 13. The airborne-particle detector of embodiment 12, an image of the first light emitter in the first image plane having a first image-height, an image of the second light emitter in the second image plane having a second image-height in a vertical direction substantially perpendicular to the first direction; and the first tube having at least one of (i) a first aperture-height in the vertical direction equals or exceeds each of the first image-height and the second image-height and (ii) a first aperture-width in the first direction equals or exceeds a distance between the first image plane and the second image plane.

Embodiment 14. The airborne-particle detector of either one of embodiments 12 or 13, a proximal end of the first tube, relative to a first optical axis of the first imaging element, being directly between the first imaging element and the second imaging element along the first direction.

Embodiment 15. The airborne-particle detector of embodiment 14, an image of the first light emitter in the first image plane having a first image-width in a horizontal direction substantially perpendicular to the first direction; an image of the second light emitter in the second image plane having a second image-width in the horizontal direction; and a distance between the proximal end and the first optical axis, exceeding each of the first image-width and the second image-width.

Embodiment 16. The airborne-particle detector of either one of embodiments 14 or 15, further comprising: a second tube extending between the first image plane and the second image plane, and having a second tube-axis that is substantially parallel to the first tube-axis and extends through the first tube.

Embodiment 17. The airborne-particle detector of any one of embodiments 1-16, a distance between the first imaging element and the second imaging element along the first direction exceeding a sum of a first focal length of the first imaging element and a second focal length of the second imaging element.

Embodiment 18. A method for detecting scattered light, comprising: illuminating a scattering region from opposite sides of the scattering region; and directing light scattered from the scattering region to a photodetector.

Embodiment 19. The method of embodiment 18, said illuminating comprising illuminating the scattering region with illumination having a center wavelength between 0.5 micrometers and 0.6 micrometers.

Embodiment 20. The method of either one of embodiments 19 or 20, an optical spectrum of the illumination having a full-width half-maximum spectral width of at least 100 nanometers.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments.

Regarding instances of the terms "and/or" and "at least one of," for example, in the cases of "A and/or B" and "at least one of A and B," such phrasing encompasses the selection of (i) A only, or (ii) B only, or (iii) both A and B. In the cases of "A, B, and/or C" and "at least one of A, B, and C," such phrasing encompasses the selection of (i) A only, or (ii) B only, or (iii) C only, or (iv) A and B only, or (v) A and C only, or (vi) B and C only, or (vii) each of A and B and C. This may be extended for as many items as are listed.

The following claims are intended to cover all generic and specific features described herein, as well as all statements of the scope of the present method and system, which, as a matter of language, might be said to fall therebetween.

We claim:

1. An airborne-particle detector comprising:
a first emitter unit, including a first light emitter and a first imaging element, that outputs a first incident beam propagating in a first direction toward a scattering region;
a second emitter unit, including a second light emitter and a second imaging element, that outputs a second incident beam propagating toward the scattering region in a second direction substantially antiparallel to the first direction; and
a photodetector that detects scattered illumination from the scattering region;
wherein:
the first imaging element images the first light emitter to a first image plane,
the second imaging element images the second light emitter to a second image plane,
the scattering region is between the first image plane and the second image plane, and either or both of, along the first direction:
the first image plane is between (i) the second image plane and (ii) one or both of the second imaging element and the second emitter unit; and
the second image plane is between (iii) the first image plane and (iv) one or both of the first imaging element and the first emitter unit.

2. The airborne-particle detector of claim 1, the first imaging element being between the first light emitter and the second imaging element along the first direction; and/or the second imaging element being between the second light emitter and the first imaging element along the first direction.

3. The airborne-particle detector of claim 1, a center emission wavelength of one or both of the first light emitter and the second light emitter being between 0.5 micrometers and 0.6 micrometers.

4. The airborne-particle detector of claim 1, an emission spectrum of one or both of the first light emitter and the second light emitter having a full-width half-maximum spectral width of at least 100 nanometers.

5. The airborne-particle detector of claim 1, the scattering region being intersected by at least one of a first optical axis of the first imaging element and a second optical axis of the second imaging element.

6. The airborne-particle detector of claim 1, further comprising a light-collector that collects the scattered illumination and directs the collected scattered illumination to the photodetector.

7. The airborne-particle detector of claim 6, further comprising a collimator between the light-collector and the scattering region.

8. The airborne-particle detector of claim 1, and further comprising:
a reflector that reflects part of the scattered illumination toward the photodetector.

9. The airborne-particle detector of claim 8, the photodetector being on a first side of the scattering region, the reflector being on a second side of the scattering region opposite the first side and facing the photodetector.

10. The airborne-particle detector of claim 8, the reflector including a concave mirror.

11. The airborne-particle detector of claim 1, further comprising:
a first tube extending between the first image plane and the second image plane, and having a first tube-axis that is substantially perpendicular to the first direction.

12. The airborne-particle detector of claim 11, the first tube being electrically conductive.

13. The airborne-particle detector of claim 11,
an image of the first light emitter in the first image plane having a first image-height, an image of the second light emitter in the second image plane having a second image-height in a vertical direction substantially perpendicular to the first direction; and
the first tube having at least one of (a) a first aperture-height in the vertical direction equals or exceeds each of the first image-height and the second image-height and (b) a first aperture-width in the first direction equals or exceeds a distance between the first image plane and the second image plane.

14. The airborne-particle detector of claim 11,
a proximal end of the first tube, relative to a first optical axis of the first imaging element, being directly between the first imaging element and the second imaging element along the first direction;
an image of the first light emitter in the first image plane having a first image-width in a horizontal direction substantially perpendicular to the first direction;
an image of the second light emitter in the second image plane having a second image-width in the horizontal direction; and
a distance between the proximal end and the first optical axis, exceeding each of the first image-width and the second image-width.

15. The airborne-particle detector of claim 11, a proximal end of the first tube, relative to a first optical axis of the first imaging element, being directly between the first imaging element and the second imaging element along the first direction; and further comprising:

a second tube extending between the first image plane and the second image plane, and having a second tube-axis that is substantially parallel to the first tube-axis and extends through the first tube.

16. The airborne-particle detector of claim 1, a distance between the first imaging element and the second imaging element along the first direction exceeding a sum of a first focal length of the first imaging element and a second focal length of the second imaging element.

17. A method for detecting scattered light, comprising:

illuminating, with a first incident beam emitted by a first light emitter, a scattering region from a first side of the scattering region;

illuminating, with a second incident beam emitted by a second light emitter, the scattering region from a second side of the scattering region that is opposite the first side; and directing light scattered from the scattering region to a photodetector;

wherein:

illuminating with the first incident beam includes imaging the first light emitter to a first image plane with a first imaging element;

illuminating with the second incident beam includes imaging the second light emitter to a second image plane with a second imaging element;

the scattering region is between the first image plane and the second image plane;

and either or both of, along the first direction:

the first image plane is between (i) the second image plane and (ii) one or both of the second imaging element and a second emitter unit, which includes the second light emitter and the second imaging element; and/or the second image plane is between (iii) the first image plane and (iv) one or both of the first imaging element and a first emitter unit, which includes the first light emitter and the first imaging element.

18. The method of claim 17, said illuminating comprising illuminating the scattering region with illumination having a center wavelength between 0.5 micrometers and 0.6 micrometers.

19. The method of claim 18, an optical spectrum of the illumination having a full-width half-maximum spectral width of at least 100 nanometers.

20. An airborne-particle detector comprising:

a first emitter unit, including a first light emitter and a first imaging element, that outputs a first incident beam propagating in a first direction toward a scattering region;

a second emitter unit, including a second light emitter and a second imaging element, that outputs a second incident beam propagating toward the scattering region in a second direction substantially antiparallel to the first direction;

a photodetector that detects scattered illumination from the scattering region; and a first tube extending between a first image plane and a second image plane, and having a first tube-axis that is substantially perpendicular to the first direction;

wherein:

the first imaging element images the first light emitter to the first image plane, the second imaging element images the second light emitter to the second image plane, the scattering region is between the first image plane and the second image plane;

a proximal end of the first tube, relative to a first optical axis of the first imaging element, is directly between the first imaging element and the second imaging element along the first direction;

an image of the first light emitter in the first image plane has a first image-width in a horizontal direction substantially perpendicular to the first direction;

an image of the second light emitter in the second image plane has a second image-width in the horizontal direction; and a distance between the proximal end and the first optical axis, exceeds each of the first image-width and the second image-width.

\* \* \* \* \*